BEST AVAILABLE COPY

Horton & Hawkins, 4. Sheets. Sheet. 1.

Meter.

No. 4206. Reissued Dec. 20. 1870.

Witnesses.

Uriah Wild

E. R. Brown.

Inventors.

J. C. Horton

S. K. Hawkins by T. C. Theaker

Attorney.

H. PETERS, PHOTO-LITHOGRAPHER, WASHINGTON, D. C.

Horton & Hawkins, 4. Sheets, Sheet. 2.

Meter.

No. 4206. Reissued Dec. 20. 1870.

Inventors.
J. C. Horton.
S. K. Hawkins
by O. C. Theaker
Attorney.

N. PETERS, PHOTO-LITHOGRAPHER, WASHINGTON, D. C.

4. Sheets. Sheet. 3.

Horton & Hawkins,

Meter.

No. 4206. Reissued Dec. 20. 1870.

Witnesses.

Uriah Welch

E. R. Brown.

Inventors.

J. C. Horton

S. K. Hawkins by O. C. Theaker

Attorney.

N. PETERS, PHOTO-LITHOGRAPHER, WASHINGTON, D. C.

4 Sheets, Sheet 4.

Horton & Hawkins,

Meter.

No. 4206. Reissued Dec. 20. 1870.

Witnesses:

Uriah Welch

E. R. Brown.

Inventors.

J. C. Horton

H. K. Hawkins by O. C. Theeke

Attorney.

H. PETERS, PHOTO-LITHOGRAPHER, WASHINGTON, D. C.

121-M[redacted]CHAMBER TYPE.
164

UNITED STATES PATENT OFFICE.

JACOB C. HORTON, OF NEW YORK, AND SAMUEL K. HAWKINS, OF LANSINGBURG, NEW YORK, ASSIGNORS TO THE MANHATTAN METER COMPANY.

IMPROVEMENT IN METERS.

*Specification forming part of Letters Patent No.* 68,746, *dated September* 10, 1867; *reissue No.* 4,206; *dated December* 20, 1870.

*To all whom it may concern:*

Be it known that we, JACOB C. HORTON, of the city, county, and State of New York, and SAMUEL K. HAWKINS, of Lansingburg, in the county of Rensselaer and State of New York, have invented certain new and useful Improvements in Liquid and Fluid Meters, and in the method of operating valves; and we do hereby declare that the following is a full, clear, and exact description thereof, sufficient to enable those skilled in the art to which our invention appertains to make and use the same, reference being had to the accompanying drawings making part of this specification, and to the letters and figures marked thereon.

Our invention relates to certain improvements on that for which Letters Patent of the United States were granted to us bearing date April 2, 1867; and it consists in the peculiar construction and operation of parts as hereinafter particularly referred to.

Figure 2:
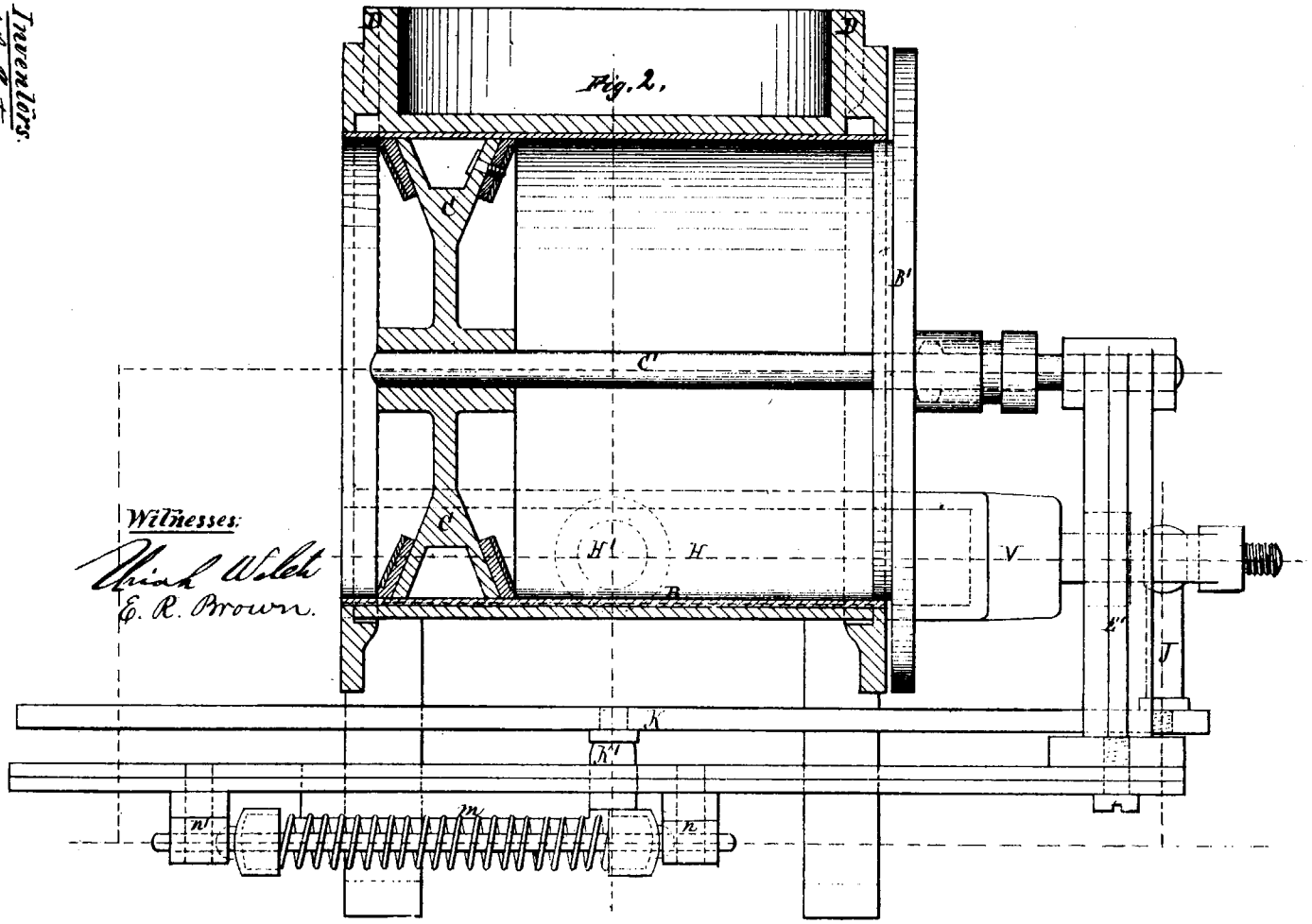
Figure 3:
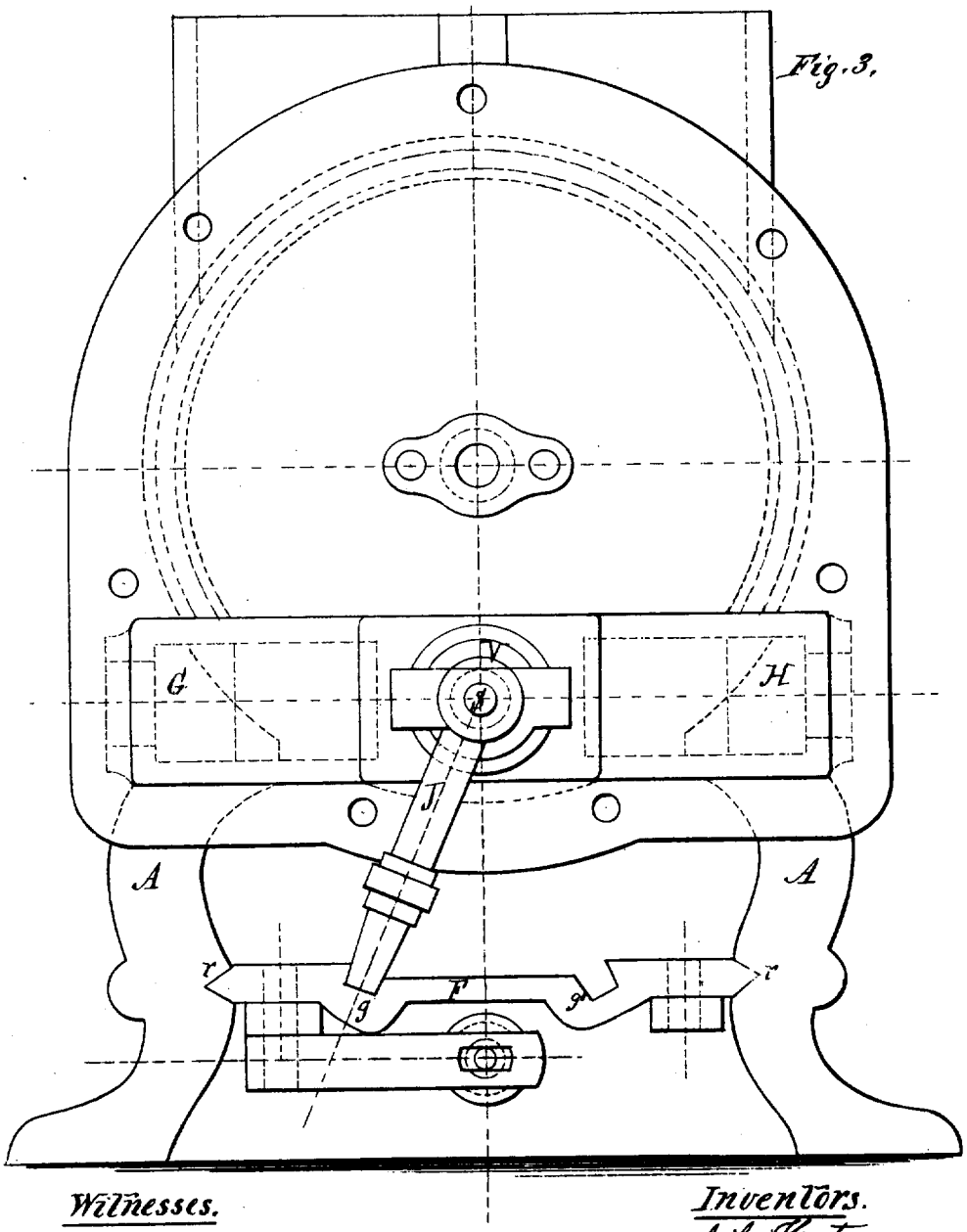
Figure 4:
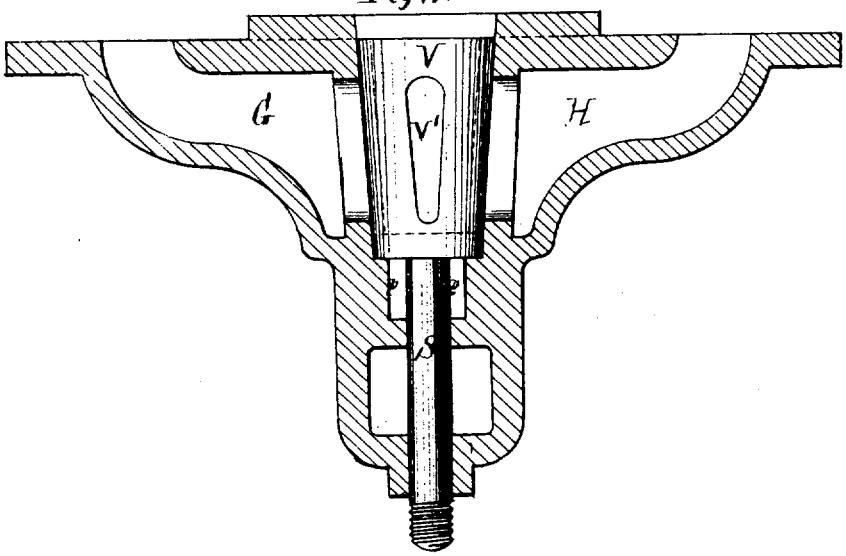
Figure 5:
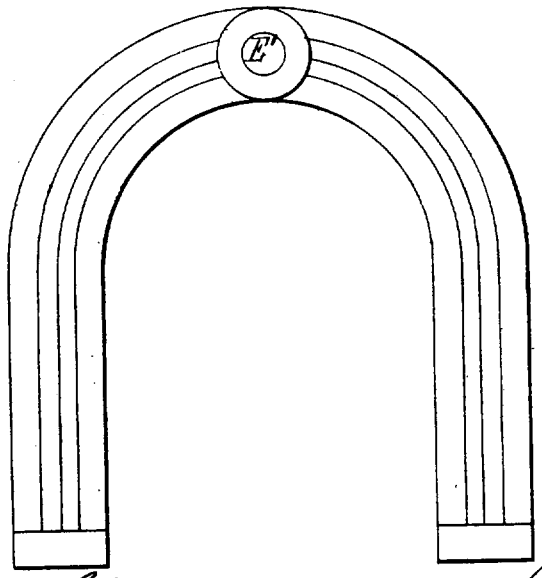

In the drawings, Figure 1, Sheet 1, is a plan view of our improved meter, the cylinder-heads being removed and the mechanism below the cylinder shown in dotted lines. Fig. 2, Sheet 2, is a vertical section through the center of the measuring-cylinder, one of the heads being removed. Fig. 3, Sheet 3, is an elevation of the front end of the meter. Fig. 4, Sheet 4, is a sectional view, showing one of the valves, with the valve-seat, induction and eduction pipes, and cylinder-head. Fig. 5, Sheet 4, is a detached view of the bracket which connects the piston-rod with the reciprocating frame and plate underneath the cylinder.

The meter stands upon legs A A, which may be cast solid with the cylinder. The measuring-cylinder B B is made of cast-iron, and lined with brass. C is the piston, and C′ the piston-rod. B′ is the front head of the cylinder. D is a dial-case for containing a dial-face and registering-index. (Not shown in the drawings.) E is a reciprocating frame, located underneath the cylinder, and carried to and fro by the piston-rod, by means of the connecting-bracket E′ attached to the front end of the piston-rod. F is a skeleton plate connecting the two side bars of the frame E, and having in its upper side two grooves, *g* and *g*′. (Shown by dotted lines in Fig. 1, but more distinctly in cross-section in Fig. 3.)

Figure 1:
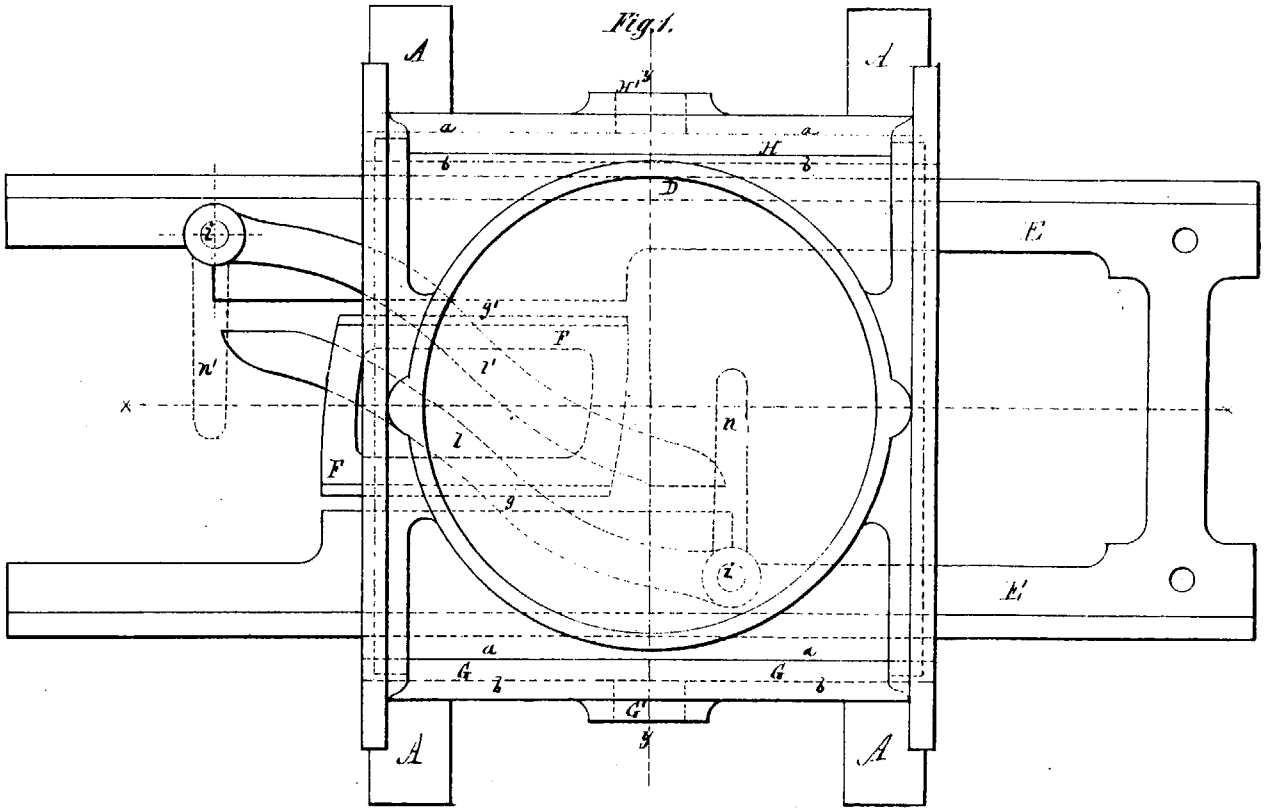

The induction-pipe G G (the internal diameter of which is shown by dotted lines *a b*, Fig. 1) branches at the induction port G′, and runs to each end of the cylinder, where it connects with continuation cross-pipes, one of which is shown at G, Fig. 4.

The eduction pipe H H (shown by dotted lines *a b*, Fig. 1) branches at the eduction-port H′, and connects with continuation cross-pipes in the cylinder-heads, like the induction-pipe, one of which said continuation cross-pipes is shown at H in Fig. 4.

The side induction and eduction pipes are cast on and with the cylinder, and the cross-pipes are cast on and with the cylinder-heads, so that when the cylinder heads are in place the side and cross pipes unite and become continuous.

At each end of the cylinder there is a conical oscillating valve, V, which is hollow, and has an opening or slot, V′, to admit water or other liquid or fluid into the cylinders through the induction-pipe G, or out through eduction-pipe H, as said slot coincides with one or the other of said pipes. S, Fig. 4, is the valve-stem, and *p p* the packing. A precisely similar valve, with the same arrangement of pipes, stem, and packing, is connected with the opposite cylinder-head.

The piston-rod moves in a stuffing-box, I, Fig. 3, in the front cylinder-head, but does not pass through the rear cylinder-head.

To the outer end of each valve-stem an arm, J, is rigidly affixed, extending downward at right angles with the valve-stems. These arms J are connected together at their lower ends by a bar, K, Fig. 2; but neither the valve nor the arm J is shown at the rear end of the cylinder in the drawing.

A stud, K′, is fixed in the center of the bar K, and projects down into groove *g* or *g*′, according as said stud may be thrown to the right or left by the means hereinafter described.

Two levers, *l* and *l*′, are pivoted to the side bars of the reciprocating frame E, (on the upper side thereof,) at *i* and *i*′. The pivots pass through said side bars, under which are two transverse levers, *n* and *n'*, attached to the lower ends of said pivots *i* and *i'*, both the upper and lower levers being rigidly attached to the pivots, which turn in said side bars, thus forming bent levers turning on their fulcra *i* and *i'*. The ends of said transverse levers *n* and *n'* are connected by a spiral spring, *m*, (shown clearly in Fig. 2,) which tends to strain the ends of said levers toward each other.

The slots V' in the valves V are on opposite sides of said valves, so that (the valves oscillating together) when the slot at the front end coincides with the induction-pipe G that at the rear end coincides with the eduction-pipe H, and vice versa.

The operation is as follows: When the piston is moving from the rear end to the front end of the cylinder, the stud K' is in the groove *g* of the reciprocating plate F, holding the valves in such position that the slot in the rear-end valve coincides with induction-pipe G, while eduction-pipe H, at the same end, is closed; but at the same time induction-pipe G at the front end is closed, and eduction-pipe H at the same end is open. The liquid (under sufficient pressure) is therefore forced into the rear end of the cylinder through the induction-pipe and valve, moving the piston toward the front end of the cylinder, and forcing the liquid out of said front end through the valve and eduction-pipe. When the piston has reached the extreme front end of the cylinder, the rear end of reciprocating plate F has passed the stud K', which, being disengaged from the groove *g*, is suddenly thrown by the lever *l*, actuated by the spiral spring *m*, across the end of plate F, until arrested by a ledge in line with the outer edge of groove *g'*. This causes both valve-stems so far to oscillate as to reverse the valve-ports, bringing the slot in the front-end valve to coincide with the induction-pipe, and closing the eduction-pipe at that end, while at the rear end the induction-pipe is closed and the eduction-pipe is opened at the same instant. As soon as said valves are reversed the pressure on the front side of the piston causes it to reverse its motion automatically and travel back toward the rear end of the cylinder, the stud K' taking the groove *g'*; and when it reaches that point, as shown in Fig. 2, the lever *l'*, pressing upon the stud K', throws it back to groove *g*, and so the reciprocating motion of the piston is automatically kept up, and at each stroke of the piston the contents of the measuring-cylinder are discharged in uniform quantities. The reciprocating frame E slides in V-shaped grooves in the legs of the machine, as shown at *r r*, Fig. 2.

An index, to be operated by familiar mechanism, which will suggest itself to any competent mechanic, should be attached, to indicate on a dial-plate the strokes of the piston. The meter is intended to operate under a pressure of about two pounds to the square inch, more or less.

What we claim as new, and desire to secure by Letters Patent, is—

1. A valve or valves for liquid meters and other purposes, moved instantaneously at the extremity of the travel of the piston by means of power accumulated during the travel of said piston, substantially as shown and described.

2. The reciprocating grooved plate F, in combination with the oscillating valves, the arms J, bar K, stud K', and the spring and levers by which said stud is thrown from one groove to the other, substantially as shown and described.

3. The reciprocating grooved plate F, in combination with the stud K' and the levers and spring by which said stud is thrown from one groove to the other, as a means of operating oscillating valves, substantially as shown and described.

JACOB C. HORTON.
SAMUEL K. HAWKINS.

Witnesses:
M. YOUNGLOVE,
A. C. TROINING.